Oct. 27, 1925.

L. H. STEELE 1,559,194

COMBINED AUTOMOBILE SIGNALING AND ADVERTISING DEVICE

Filed Dec. 1, 1924

Inventor
Lawrence H. Steele
by Wilkinson & Giusta
Attorneys

Patented Oct. 27, 1925.

1,559,194

UNITED STATES PATENT OFFICE.

LAWRENCE HILL STEELE, OF VAUGHN, GEORGIA, ASSIGNOR OF ONE-HALF TO JOHN WIMBISH GUINN, OF LA GRANGE, GEORGIA.

COMBINED AUTOMOBILE SIGNALING AND ADVERTISING DEVICE.

Application filed December 1, 1924. Serial No. 753,274.

*To all whom it may concern:*

Be it known that I, LAWRENCE HILL STEELE, a citizen of the United States, residing at Vaughn, Spalding County, Georgia, have invented certain new and useful Improvements in Combined Automobile Signaling and Advertising Devices, of which the following is a specification.

My invention relates primarily to improvements in apparatus automatically operable from the front and intended to signal from the rear when the automobile is about to stop. Associated with such apparatus is a signboard adjacent to the visible movable part of the signal which may be used for advertising purposes.

It is well known that for advertising purposes some movable part or apparatus is much more apt to attract attention than an advertising device which is not associated with such movable part or apparatus. For instance, movable advertising devices in show windows are apt to draw crowds where a much more elaborate advertising arrangement will be passed unnoticed.

My invention will be more fully understood after reference to the accompanying drawings, in which like parts are indicated by similar reference symbols throughout the several views, and in which:—

Figure 1:
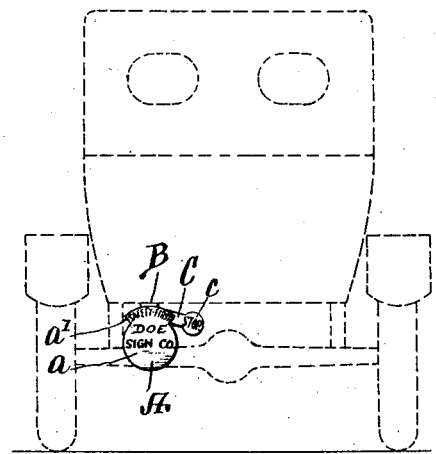
Figure 1 shows that part of the apparatus which is visible from the rear of an automobile, the automobile being shown in dotted lines and the apparatus in full lines.
Figure 2:
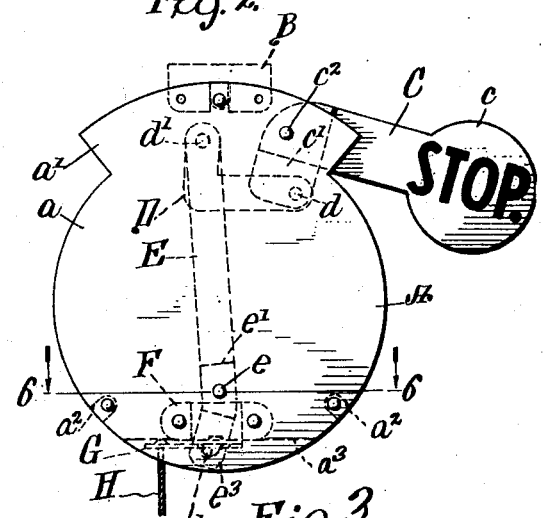
Figure 2 is an enlarged view of that portion of the apparatus shown in Fig. 1 and in the position shown in said figure, but with the advertising matter omitted from the signboard for the sake of clearness in the drawings.
Figure 3:
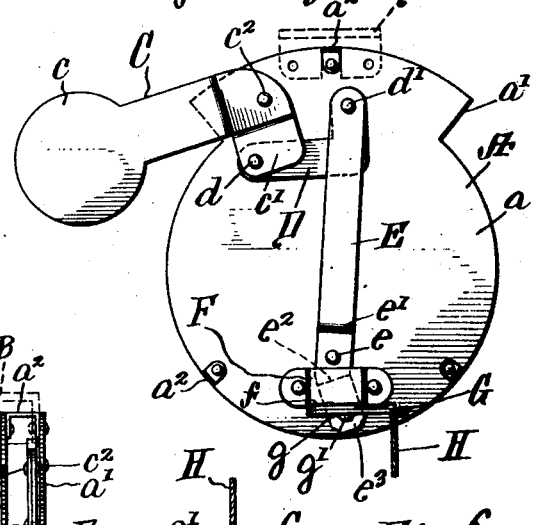
Figure 3 is a rear view of the device shown in Figs. 1 and 2 with the parts in the position shown in said figures, that is, with the signal arm extended to indicate that the machine is about to stop, but with the rear base plate removed.

A and A' represent signboards or base plates which are preferably of artistic shape, such as a circle $a$ surmounted by an extension $a'$ in the shape of a keystone. These base plates are spaced apart in any convenient way as by the clips $a^2$. The plate A' is cut away at $a^3$. These base plates are attached to the automobile in any convenient way, as by means of the bracket B shown in full lines in Figure 1, and in dotted lines in Figures 2, 3 and 4.

C represents a signal arm which is in the form of a bell crank lever having preferably an enlarged end $c$ adapted to project beyond the base plate when the device is operated, and the shorter shoulder arm $c'$ adapted to pass behind the base plate and be normally hidden thereby. This bell crank C is pivoted, as at $c^2$, to the base plate and has connected thereto, as at $d$, an L-shaped link D having its outer arm connected, as at $d'$, to the lever E.

Figure 5:
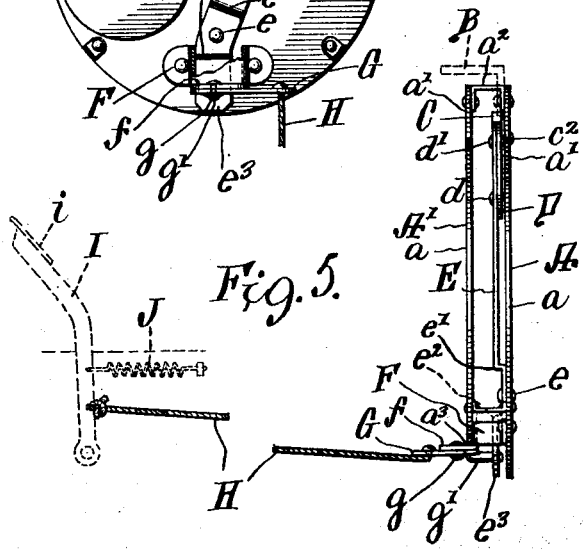
Figure 5 is a diagram showing the apparatus of Figs. 1 to 4 in side elevation, and the brake lever for automatically operating same in dotted lines.
Figure 6:
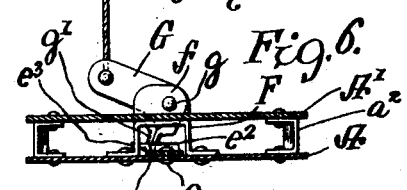
Figure 6 shows a section along the line 6—6 of Fig. 2, and looking in the direction of the arrows.

The lever E is pivoted, as at $e$, to the base plate and is shouldered rearwards, as at $e'$, so as to allow clearance for the arm C. The lower end of this lever E is bent outwards again, as at $e^2$, to provide the necessary clearance, and is slotted at its lower end $e^3$ to engage the arm $g'$ of the bell crank lever G which is pivoted, as at $g$, in the flange $f$ projecting from the bracket F secured to the back of the base plate A, as shown most clearly in Figs. 5 and 6.

This bell crank lever G is connected by a flexible connector, such as a wire cable or chain H, to the brake lever I, having the pedal $i$, which brake lever is normally retracted by the spring J in the usual way. It will be seen that by pressing on this brake lever, the cable H will pull on the bell crank lever G, and the swinging movement of this lever G will be transmitted to the lever E and through it to the bell crank D and bell crank C carrying the signal arm C.

Figure 4:
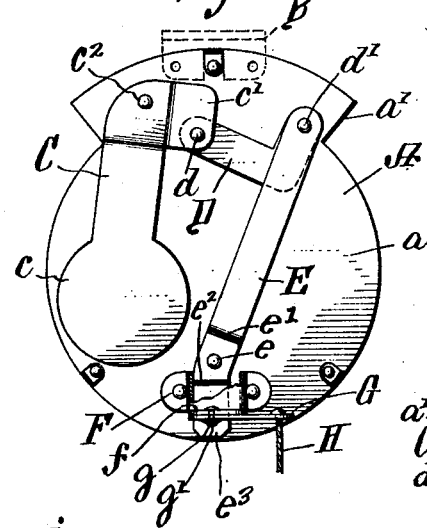
Figure 4 is a similar view to Fig. 3, but shows the apparatus in the ordinary running position with the signal arm concealed.

Thus, it will be seen that pressing forward on the brake lever will automatically swing out the signal arm and cause the same to be visible, and when the brake lever is returned to the initial position by the spring J the weight of the signal arm will restore the parts to the initial or hidden position as shown in Fig. 4.

While I have shown the device attached to the rear of the automobile, it may be attached to the fender or any other convenient part of the vehicle, so that both faces of the device containing the lever may show advertising matter.

It will be obvious that various modifications might be made in the construction, combination and arrangement of parts which could be used without departing from the spirit of my invention; and I do not mean to limit the invention to such details except as particularly pointed out in the claims.

Having thus described my invention, what I claim and desire to secure by Letters Patent of the United States is:—

1. An automobile signal comprising a plate adapted to be attached to an automobile, a signal arm pivoted upon the back of the plate and adapted to swing outwardly beyond the edge of the plate into exposed position and to swing down behind the plate out of sight, said arm having an angular extension at its pivot end, a lever pivoted to the lower portion of the plate at said side and having an under arm extending upwardly into proximity to the pivot of the signal arm, an L-shaped link pivotally connected at one end to the angular extension of the signal arm, and at its other end extending upwardly and pivotally connected to the upper end of said lever, a bracket carried upon said plate about the lower end of said lever and having an out turned plate at its lower edge, a bell crank lever pivoted at its angle upon said plate and having one end pivotally connected to the lower end of said lever and below the pivotal support thereof, and a flexible connection to the other end of said bell crank lever, whereby a pull on said connection is adapted to swing said bell crank lever, swing the upper end of the upwardly extending lever and move the signal arm into exposed position, the weight of said signal arm being adapted to return said parts to normal position, said angle shaped link being adapted to maintain the pivotal connections of the angled extension of the signal arm and the long lever at all times out of a dead center position.

2. A signaling attachment for use with automobiles comprising a base plate adapted to be attached to the automobile, a bell crank lever pivoted in rear of said base plate and provided with a long and a short arm, the long arm carrying a signal device adapted to swing by gravity to the hidden position in rear of said base plate, an intermediate lever also pivoted to said base plate, an L-shaped link connecting said intermediate lever and the short arm of said bell crank, a bracket secured to the rear of said base plate and serving as a guide for said intermediate lever, a horizontal flange projecting rearwardly from said bracket, a second bell crank lever pivoted to said flange and having an arm engaging said intermediate lever, and a flexible connection between said second bell crank lever and the brake lever of the vehicle.

LAWRENCE HILL STEELE.